Figures 1, 2:
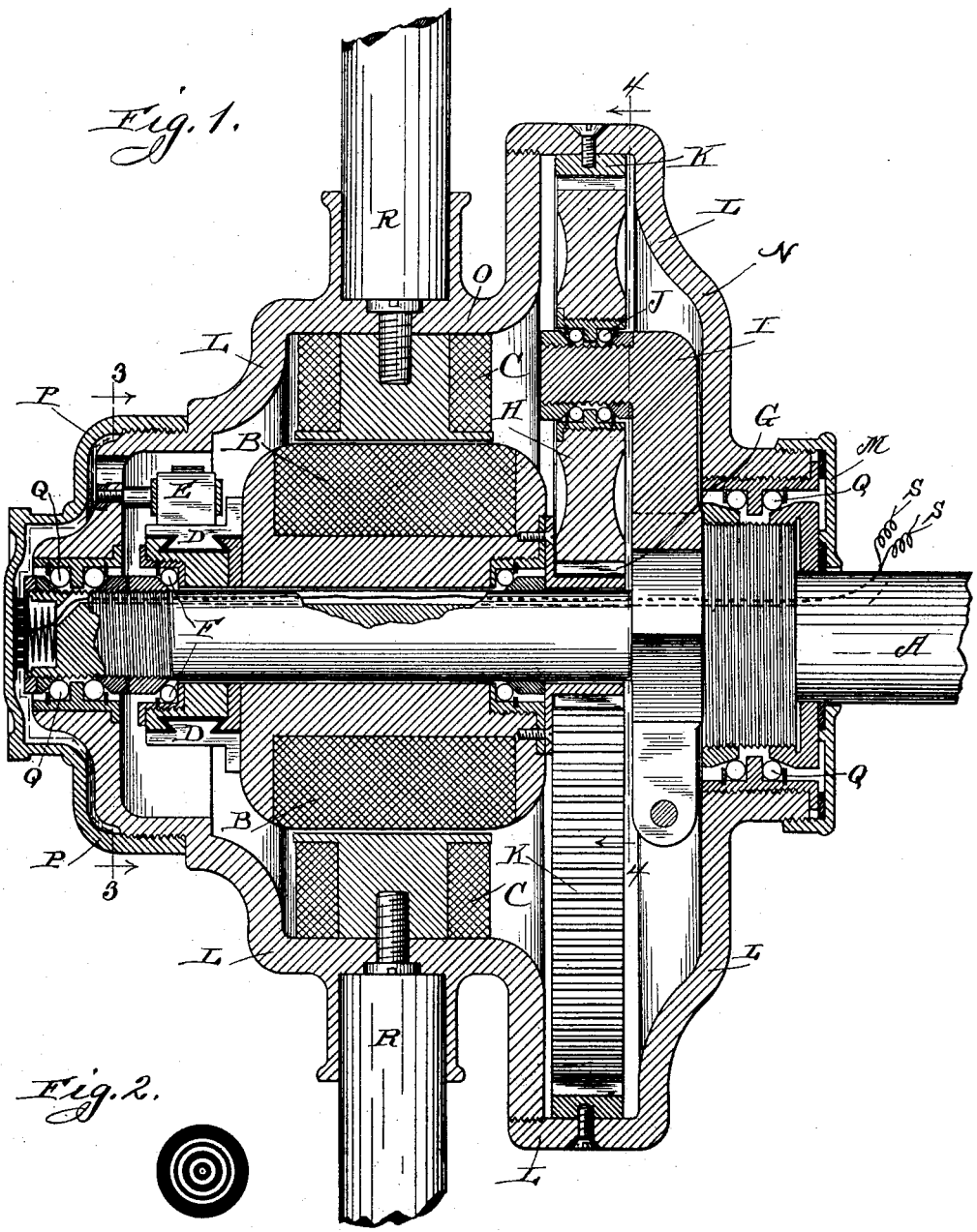

No. 638,643. Patented Dec. 5, 1899.
F. J. NEWMAN & J. LEDWINKA.
MEANS FOR PROPULSION OF VEHICLES BY ELECTRICITY.
(Application filed May 19, 1899.)
(No Model.) 2 Sheets—Sheet 1.

Witnesses:
Inventors:
Fred. J. Newman.
Josef. Ledwinka.

No. 638,643. Patented Dec. 5, 1899.
F. J. NEWMAN & J. LEDWINKA.
MEANS FOR PROPULSION OF VEHICLES BY ELECTRICITY.
(Application filed May 19, 1899.)
(No Model.) 2 Sheets—Sheet 2.
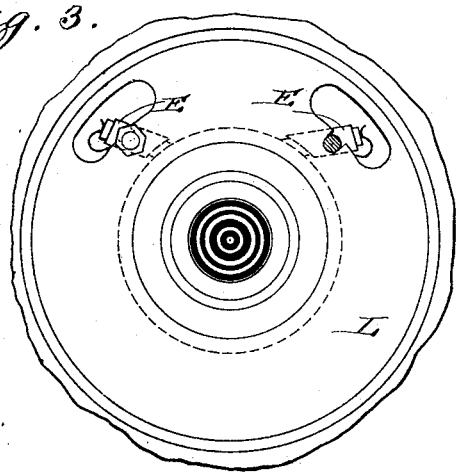
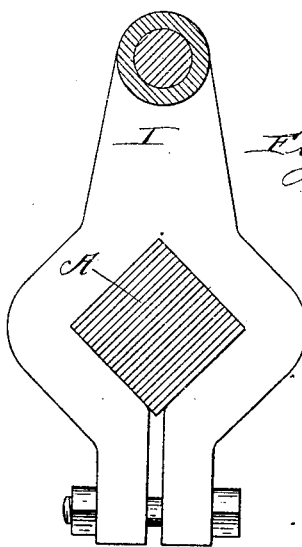
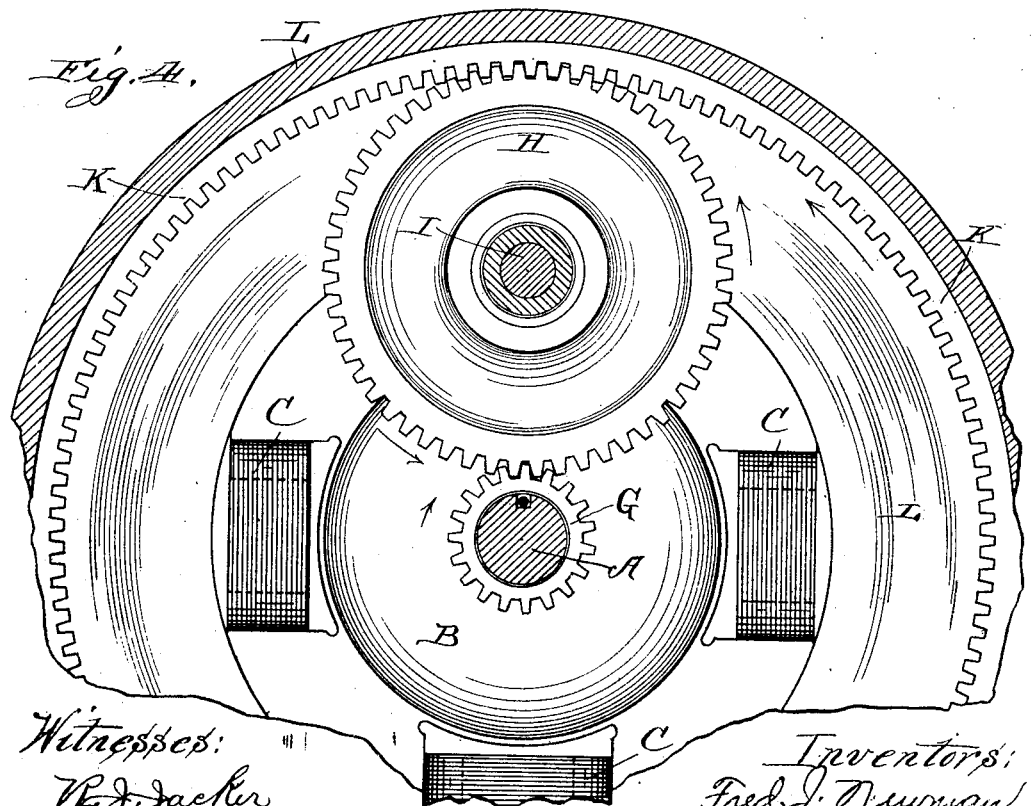

UNITED STATES PATENT OFFICE.

FRED J. NEWMAN AND JOSEF LEDWINKA, OF CHICAGO, ILLINOIS.

MEANS FOR PROPULSION OF VEHICLES BY ELECTRICITY.

SPECIFICATION forming part of Letters Patent No. 638,643, dated December 5, 1899.

Application filed May 19, 1899. Serial No. 717,477. (No model.)

*To all whom it may concern:*

Be it known that we, FRED J. NEWMAN, a citizen of the United States, and JOSEF LEDWINKA, a subject of the Emperor of Austria-Hungary, both residing at the city of Chicago, county of Cook, and State of Illinois, have invented certain new and useful Improvements in Means for Propelling Vehicles by Electricity, of which the following is a specification.

Our invention relates to the propulsion of vehicles by the use of electricity as a motive power, and has for its object to furnish a means for the application of said power to any vehicle and at the same time not change or disfigure the general appearance of the vehicles now in use by exhibiting the mechanical parts involved in the construction thereof; and in order to accomplish our purpose we have selected the hub of the wheel in which to install the electric motor for driving the vehicle, said motor to receive electric power from batteries stored with electricity, which batteries are placed in any convenient place in the body of said vehicle.

Our invention principally consists in the housing of the electric motor and driving mechanism in the hubs of the driving-wheels which support the vehicle.

Like letters represent like parts in the accompanying drawings, which form a part hereof, in which—

Figure 1 is a central longitudinal view through the hub of a wheel with our device installed therein and journaled on a stationary axle, showing an electric motor independently journaled with ball-bearings on said axle and equipped with all the necessary parts which constitute a complete electric motor. This view also shows the motor-armature supplied with gear-wheel connections whereby said motor-armature revolving on said axle is connected with the driving-wheel of the carriage by an internal gear, which gear is attached to the hub of said driving-wheel. This view also shows the hub journaled on said stationary axle by ball-bearings, thus enabling said hub to revolve around the motor-armature, said hub carrying with it the fields of said motor, to the inner walls of which said fields are rigidly fastened. This view also shows the spoke of a wheel in position in the hub, said spoke broken off. Fig. 2 is to show four electric contact-plates supplied with a spring inserted in the end of the axle to insure perfect contact. The object of these plates, which are insulated from each other, is to independently conduct the current to their respective motors in the hubs of the wheels. Two or more of these contacts may be used. Fig. 3 is a view through line 3 3 in Fig. 1. Fig. 4 is a view through line 4 4 in Fig. 1. Fig. 5 is a bracket to be fastened to the stationary axle, in which bracket is journaled the gear-wheel which makes driving connection between the motor-armature and the internal gear, which gear is rigidly fastened to the interior of the hub of the carriage-wheel proper.

A is a carriage-axle.

B is the armature of the electric motor.

C represents the fields of said motor, securely fastened to the interior of the hub of the wheel.

D is a commutator.

E is an electric brush.

F is a ball-bearing, with proper cups and cones.

G is a geared pinion fastened to the armature.

H is a gear-wheel which is journaled by proper bearings on the bracket, which we designate as Fig. 4 in the drawings, which bracket is securely fastened to the stationary axle. I is this bracket, Fig. 4.

J represents the ball-bearings of gear-wheel H, supplied with cups and cones secured to the upper end of bracket I.

K is an internal gear rigidly fastened to the interior of the hub of the vehicle-wheel.

L is the hub. Hub L is composed of four members—namely, the rear member M, which serves to inclose the rear of the hub and contain the dust-guards; also, rear member N, center member O, and front member or cap P.

Q is the ball-bearing for hub L, properly cupped and coned on axle A.

R is a broken spoke of the carriage-wheel in position in hub L.

S represents electric conductors which make electric connection between the electric supply and the motors. These conductors are carried in a receptacle made lengthwise in the axle and brought out at the rear of the hub and thence to the electric supply.

When the parts are assembled, the operation of our device is as follows: The electric armature being journaled independently on axle A and connected, as shown and described, by gear-wheel connection with hub L, and said hub L being also journaled on said axle A, therefore when the electric current is turned onto the motor-armature said armature would revolve in one direction and gear-wheel H would revolve in the opposite direction, thus causing the vehicle-wheel, the interior of the hub of which carries the fields of the motor, to revolve in the opposite direction to the armature thereof, and thus carry the vehicle along at whatever speed is desired and in accord with the diameter of the wheels of the vehicle.

Having thus described our invention, what we claim as new and original, and desire to secure by Letters Patent, is—

1. In a vehicle propelled by electricity, a combination of the hubs of the wheels of said vehicle inclosing each an electric motor, said motors journaled on the axles of said vehicle, the shells of said hubs, which shells contain each a motor-field magnet, journaled on an axle, the armatures of said motors connected each by gear-wheels with its hub-shell, the intermediate gear-wheels between said armatures and said hubs, each journaled on a bracket, said brackets rigidly fastened to the axles of said vehicle, whereby when said armatures are revolved, the revolving motion thereof would be transmitted to the wheels of said vehicle.

2. In a vehicle propelled by electricity, a combination of an electric motor, said motor inclosed in a hollow hub of a wheel of said vehicle, the armature of said motor journaled on an axle of said vehicle, said hub also journaled on said axle, the armature of said motor supplied with geared driving connection with an internal gear, said internal gear firmly attached to the interior of said hub, the intermediate gear-wheel of said geared driving connection supported on a bracket, said bracket firmly attached to said axle, the fields of said motor securely fastened to the interior of said hub, whereby when said armature is revolved, the revolving motion thereof would be transmitted to said hub.

FRED J. NEWMAN.
JOSEF LEDWINKA.

Witnesses:
FRANCIS W. COREY,
CHARLES A. DYE.